US010635318B2

(12) United States Patent
Barczak et al.

(10) Patent No.: US 10,635,318 B2
(45) Date of Patent: Apr. 28, 2020

(54) LOGICAL STORAGE DRIVER (71) Applicant: Intel Corporation, Santa Clara, CA (US)

(72) Inventors: Mariusz Barczak, Gdansk (PL); Michal Wysoczanski, Koszalin (PL); Andrzej Jakowski, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 87 days.

(21) Appl. No.: 15/855,815

(22) Filed: Dec. 27, 2017

(65) Prior Publication Data

US 2019/0042386 A1 Feb. 7, 2019

(51) Int. Cl.
| | |
|---|---|
| *G06F 9/46* | (2006.01) |
| *G06F 3/06* | (2006.01) |
| *G06F 11/34* | (2006.01) |
| *G06F 9/50* | (2006.01) |
| *H04L 29/08* | (2006.01) |
| *H04L 12/24* | (2006.01) |
| *G06N 20/00* | (2019.01) |
| *G06F 11/10* | (2006.01) |

(52) U.S. Cl.
CPC ............ *G06F 3/061* (2013.01); *G06F 3/0632* (2013.01); *G06F 3/0653* (2013.01); *G06F 3/0683* (2013.01); *G06F 9/505* (2013.01); *G06F 9/5083* (2013.01); *G06F 11/3414* (2013.01); *G06F 11/3433* (2013.01); *G06F 11/3452* (2013.01); *G06F 11/3485* (2013.01); *H04L 67/1097* (2013.01); *G06F 11/1076* (2013.01); *G06N 20/00* (2019.01); *H04L 41/5003* (2013.01)

(58) Field of Classification Search
CPC .. G06F 3/0611; G06F 3/0604; G06F 12/0868; G06F 9/45558; G06F 11/0793; G06F 11/3433; G06F 11/3485; G06F 9/5083; G06F 3/061; H04L 43/0817; H04L 67/1097
See application file for complete search history.

(56) References Cited

U.S. PATENT DOCUMENTS

| | | | |
|---|---|---|---|
| 2012/0174096 A1* | 7/2012 | Conover ............. | G06F 9/45558 718/1 |
| 2012/0179874 A1* | 7/2012 | Chang ................. | G06F 9/45558 711/128 |
| 2013/0304903 A1* | 11/2013 | Mick ................... | H04L 43/0817 709/224 |

(Continued)

*Primary Examiner* — Tuan A Vu
(74) *Attorney, Agent, or Firm* — Thorpe North & Western, LLP (57) ABSTRACT A technology is described for a logical storage driver. An example method can include using the logical storage driver to: forward requests to a first storage stack for processing of an I/O workload associated with the I/O requests. Initiate generation of trace data for the I/O workload for collection and analysis to determine a second storage stack for improving performance of the I/O workload. Receive the storage processing logic for processing the I/O workloads using the storage configuration for the I/O workload, where the storage processing logic interfaces with the storage configuration. Intercept the I/O requests that correspond to the I/O workload. And, process the I/O workloads using the storage processing logic that interfaces with the storage configuration.

21 Claims, 5 Drawing Sheets

(56) References Cited

U.S. PATENT DOCUMENTS

| | | | |
|---|---|---|---|
| 2014/0130055 A1* | 5/2014 | Guha | G06F 3/0604 |
| | | | 718/104 |
| 2015/0254000 A1* | 9/2015 | Sivathanu | G06F 12/0868 |
| | | | 711/103 |
| 2015/0339180 A1* | 11/2015 | Shih | G06F 11/0793 |
| | | | 714/49 |
| 2017/0054720 A1* | 2/2017 | Geng | H04L 67/1097 |
| 2017/0199678 A1* | 7/2017 | Subramanian | G06F 3/0611 |

* cited by examiner

LOGICAL STORAGE DRIVER

BACKGROUND

In computing, an operating system may utilize a storage stack to process I/O (input/output) workloads generated by applications and services. A storage stack can include a set of software components and storage devices that together provide a storage platform for processing I/O workloads. The set of software components are stackable and perform various storage functions like caching, tiering, replication, as well as other storage functions. Applications and services can be configured to "run on top of" a storage stack and generate I/O workloads, which are sent to the storage stack for processing.

A storage stack may be configured to process an I/O workload using a preconfigured storage configuration, which can be tailored to the I/O workload to improve processing performance of the I/O workload. For example, an application may generate a particular I/O workload that, when processed using a particular storage technology (e.g., RAID (Redundant Array of Independent Disks), caching, tiering, etc.), improves processing performance of the I/O workload. In one example, a storage stack can be configured based on the requirements of an application's I/O workload, as well as a QoS (quality of service) policy and/or a SLA (service level agreement).

Reference will now be made to the exemplary embodiments illustrated, and specific language will be used herein to describe the same. It will nevertheless be understood that no limitation on invention scope is thereby intended.

DESCRIPTION OF EMBODIMENTS

Although the following detailed description contains many specifics for the purpose of illustration, a person of ordinary skill in the art will appreciate that many variations and alterations to the following details can be made and are considered included herein.

Accordingly, the following embodiments are set forth without any loss of generality to, and without imposing limitations upon, any claims set forth. It is also to be understood that the terminology used herein is for describing particular embodiments only, and is not intended to be limiting. Unless defined otherwise, all technical and scientific terms used herein have the same meaning as commonly understood by one of ordinary skill in the art to which this disclosure belongs. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various embodiments. One skilled in the relevant art will recognize, however, that such detailed embodiments do not limit the overall concepts articulated herein, but are merely representative thereof. One skilled in the relevant art will also recognize that the technology can be practiced without one or more of the specific details, or with other methods, components, layouts, etc. In other instances, well-known structures, materials, or operations may not be shown or described in detail to avoid obscuring aspects of the disclosure.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of phrases including "an example" or "an embodiment" in various places throughout this specification are not necessarily all referring to the same example or embodiment.

EXAMPLE EMBODIMENTS

An initial overview of embodiments is provided below and specific embodiments are then described in further detail. This initial summary is intended to aid readers in understanding the disclosure more quickly, but is not intended to identify key or essential technological features, nor is it intended to limit the scope of the claimed subject matter.

A technology is described for a logical storage driver configured to handle I/O (input/output) associated with an I/O workload generated by an application or service. An I/O workload may be a set of I/O tasks generated by an application or service configured to interface with network and storage infrastructures in order to perform I/O operations (e.g., read, write, trim, sync). The logical storage driver can be implemented as part of a storage stack that includes storage processing logic and a storage configuration comprising one or more device drivers and storage devices. The storage processing logic can be attached to the logical storage driver and interface with the storage configuration to process the I/O workload. The logical storage driver operates in the storage stack between an application and one or more device drivers and storage devices. The application sends an I/O workload to the logical storage driver, which utilizes storage processing logic to process the I/O workload to generate I/O tasks that are sent to the one or more device drivers and storage devices.

The storage stack can be dynamically updated by replacing or reconfiguring storage processing logic and a storage configuration included in the storage stack with new/updated storage processing logic and a new/updated storage configuration that improves processing performance of the I/O workload. In other words, various storage processing logic and/or storage configurations can be utilized to dynamically configure the storage stack for a specific I/O workload. The logical storage driver can be configured to operate in a detached mode or an attached mode. In detached mode, the storage processing logic is detached from the logical storage driver, and I/O requests associated with the I/O workload are passed through the logical storage driver to a default storage stack used to process the I/O requests. The default storage stack, for example, can comprise one or more device drivers and storage devices used to process I/O requests received from an application (e.g., filesystem) or service. In detached mode, the logical storage driver causes trace data associated with the I/O workload to be generated, which can be analyzed to determine a storage stack configuration for the I/O workload that can be used to improve I/O performance.

In attached mode, storage processing logic for an I/O workload is attached to the logical storage driver. For example, the storage processing logic can be registered with the logical storage driver, or the storage processing logic can be embedded in the logical storage driver. An application sends I/O requests associated with the I/O workload to the logical storage driver, and the I/O requests are intercepted and processed using the attached storage processing logic and a storage configuration defined for the I/O workload. While in attached mode, trace data associated with the I/O workload can be generated, and the trace data can be analyzed periodically to determine whether the current storage stack meets performance specifications for the I/O workload, and/or whether I/O performance may be improved using a new storage stack configuration defined for the I/O workload. In the case that a determination is made that the new storage stack may improve I/O performance of the I/O workload, the logical storage driver can be placed in detached mode, and the new storage stack can be implemented by detaching the current storage processing logic from the logical storage driver and attaching new storage processing logic to the logical storage driver that implements the new storage stack. After attaching the new storage processing logic, the logical storage driver may be placed in attached mode and I/O requests associated with the I/O workload can be processed using the new storage stack.

An I/O workload generated by an application or service may be dynamic, causing changes to aspects of the I/O workload over time. As such, a storage stack used to process the I/O workload may no longer meet acceptable performance specifications for the I/O workload. In traditional systems, a storage stack had to be manually maintained, upgraded, or reconfigured to respond to a changing I/O workload. For example, a change to an I/O workload generated by an application may result in decreased I/O performance, which may have resulted in having to stop the application and reconfigure the storage stack (e.g., changing a RAID level, replacing storage caching with tiering, reconfiguring storage devices, etc.) in order to increase I/O performance. Reconfiguring the storage stack can result in data service unavailability due to having to stop execution of an application or service, which can scale over multiple datacenter nodes that are updated with the reconfigured software storage stack.

The present technology allows a storage stack to be reconfigured without having to stop execution of an application or service, thereby avoiding service unavailability. For example, a logical storage driver used to implement the storage stack can be placed in detached mode and the current storage stack can be replaced with a new storage stack. I/O requests may be passed through the logical storage driver and handled by a default storage stack while the storage processing logic and storage configuration prepares the new storage stack. Consequently, an application or service may continue to execute without interruption while the new storage stack is being prepared and implemented.

Figure 1:
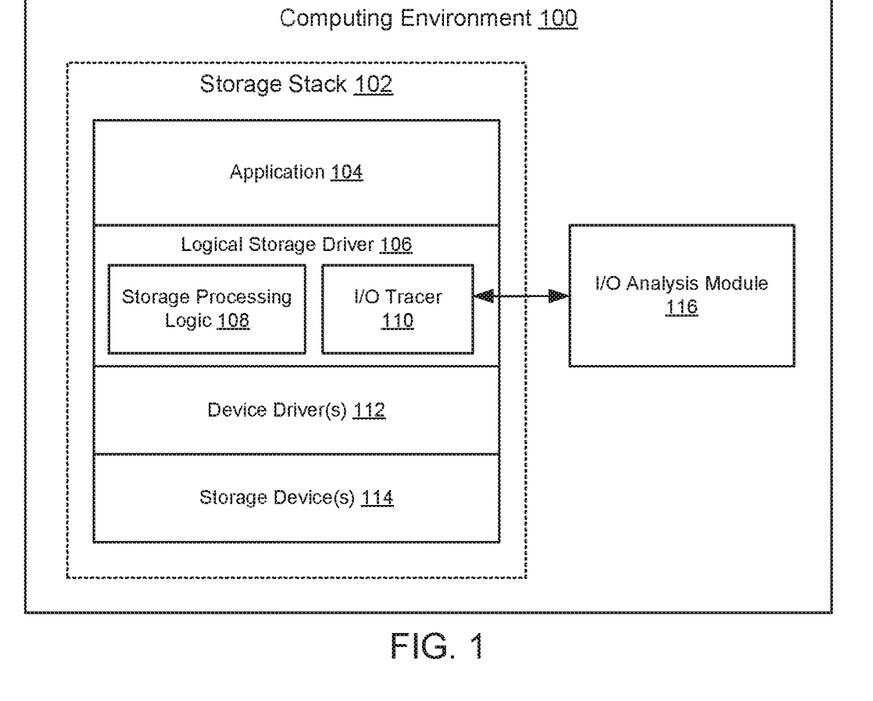
FIG. 1 is a block diagram illustrating an example storage stack that includes a logical storage driver in accordance with an example embodiment.

To further describe the present technology, FIG. 1 is a block diagram illustrating an example storage stack 102 that includes a logical storage driver 106 hosted in a computing environment 100. The storage stack 102 can include a set of software components used to provide storage processing logic 108 and storage devices 114 that together provide a storage platform for processing I/O workloads. In the example illustrated, the storage stack 102 can include an application 104 or file system that generates an I/O workload. An I/O workload generated by an application 104 can be complex, application dependent, operation dependent, and/or data dependent. For example, an I/O workload for a warehousing application may be different than an I/O workload for an OLTP (online transaction processing) application, where hit rates of a buffer cache can vary by application; and tables, indexes, and queries in a database may be application dependent. Also, storage techniques used to process a particular I/O workload may impact on I/O performance. For example, processing a particular I/O workload using RAID may result in better performance as compared to processing the I/O workload using caching.

As illustrated in FIG. 1, the storage stack 102 includes a logical storage driver 106. The logical storage driver 106 may comprise a software component (e.g., middleware) included in the storage stack 102, and the logical storage driver 106 may act as an intermediary driver that executes on top of a storage configuration comprising one or more device drivers 112 and storage devices 114. The storage devices 114 can include any type of memory, including any compatible type of volatile or nonvolatile memory (NVM). NVM is a storage medium that does not require power to maintain the state of data stored by the medium. NVM has traditionally been used for the task of data storage, or long-term persistent storage, but new and evolving memory technologies allow the use of NVM in roles that extend beyond traditional data storage. One example of such a role is the use of NVM as main or system memory. Non-volatile system memory (NVMsys) can combine data reliability of traditional storage with ultra-low latency and high bandwidth performance, having many advantages over traditional volatile memory, such as high density, large capacity, lower power consumption, and reduced manufacturing complexity, to name a few. Byte-addressable, write-in-place NVM such as three-dimensional (3D) cross-point memory, for example, can operate as byte-addressable memory similar to dynamic random-access memory (DRAM), or as block-addressable memory similar to NAND flash. In other words, such NVM can operate as system memory or as persistent storage memory (NVMstor). In some situations where NVM is functioning as system memory, stored data can be discarded or otherwise rendered unreadable when power to the NVMsys is interrupted. NVMsys also allows increased flexibility in data management by providing non-volatile, low-latency memory that can be located closer to a processor in a computing device. In some examples, NVMsys can reside on a DRAM bus, such that the NVMsys can provide ultra-fast DRAM-like access to data. NVMsys can also be useful in computing environments that frequently access large, complex data sets, and environments that are sensitive to downtime caused by power failures or system crashes.

Nonlimiting examples of NVM can include planar or three-dimensional (3D) NAND flash memory, including single or multi-threshold-level NAND flash memory, NOR flash memory, single or multi-level Phase Change Memory (PCM), such as chalcogenide glass PCM, planar or 3D PCM, cross-point array memory, including 3D cross-point memory, non-volatile dual in-line memory module (NVDIMM)-based memory, such as flash-based (NVDIMM-F) memory, flash/DRAM-based (NVDIMM-N) memory, persistent memory-based (NVDIMM-P) memory, 3D cross-point-based NVDIMM memory, resistive RAM (ReRAM), including metal-oxide- or oxygen vacancy-based ReRAM, such as $HfO_2$-, $Hf/HfO_x$-, $Ti/HfO_2$-, $TiO_x$-, and $TaO_x$-based ReRAM, filament-based ReRAM, such as $Ag/GeS_2$-, $ZrTe/Al_2O_3$-, and Ag-based ReRAM, programmable metallization cell (PMC) memory, such as conductive-bridging RAM (CBRAM), silicon-oxide-nitride-oxide-silicon (SONOS) memory, ferroelectric RAM (FeRAM), ferroelectric transistor RAM (Fe-TRAM), anti-ferroelectric memory, polymer memory (e.g., ferroelectric polymer memory), magnetoresistive RAM (MRAM), write-in-place non-volatile MRAM (NVMRAM), spin-transfer torque (STT) memory, spin-orbit torque (SOT) memory, nanowire memory, electrically erasable programmable read-only memory (EEPROM), nanotube RAM (NRAM), other memristor- and thyristor-based memory, spintronic magnetic junction-based memory, magnetic tunneling junction (MTJ)-based memory, domain wall (DW)-based memory, and the like, including combinations thereof. The term "memory device" can refer to the die itself and/or to a packaged memory product. NVM can be byte or block addressable. In some examples, NVM can comply with one or more standards promulgated by the Joint Electron Device Engineering Council (JEDEC), such as JESD21-C, JESD218, JESD219, JESD220-1, JESD223B, JESD223-1, or other suitable standard (the JEDEC standards cited herein are available at www.jedec.org). In one specific example, the NVM can be 3D cross-point memory. In another example, the NVM can be NAND or 3D NAND.

The storage devices 114 can also include various types of volatile memory, which is not considered to be limiting. Volatile memory is a storage medium that requires power to maintain the state of data stored by the medium. Nonlimiting examples of volatile memory can include random access memory (RAM), such as static random-access memory (SRAM), dynamic random-access memory (DRAM), synchronous dynamic random-access memory (SDRAM), and the like, including combinations thereof. SDRAM memory can include any variant thereof, such as single data rate SDRAM (SDR DRAM), double data rate (DDR) SDRAM, including DDR, DDR2, DDR3, DDR4, DDR5, and so on, described collectively as DDRx, and low power DDR (LPDDR) SDRAM, including LPDDR, LPDDR2, LPDDR3, LPDDR4, and so on, described collectively as LPDDRx. In some examples, DRAM complies with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209B for LPDDR SDRAM, JESD209-2F for LPDDR2 SDRAM, JESD209-3C for LPDDR3 SDRAM, and JESD209-4A for LPDDR4 SDRAM (these standards are available at www.jedec.org; DDR5 SDRAM is forthcoming). Such standards (and similar standards) may be referred to as DDR-based or LPDDR-based standards, and communication interfaces that implement such standards may be referred to as DDR-based or LPDDR-based interfaces. In one specific example, the system memory can be DRAM. In another specific example, the system memory can be DDRx SDRAM. In yet another specific aspect, the system memory can be LPDDRx SDRAM.

Returning to FIG. 1, an I/O workload generated by an application 104 may be sent to the logical storage driver 106. The logical storage driver 106 may be configured to operate in one of two modes, a detached mode or an attached mode. As described in more detail below, when in detached mode, I/O requests associated with an I/O workload may be passed through the logical storage driver 106 to a default storage stack for processing of the I/O requests. While operating in detached mode, trace data associated with the I/O workload may be generated using an I/O tracer 110. Illustratively, the I/O tracer 110 may be an application that monitors I/O and generates I/O workload telemetry data, such as resource usage metrics related to the I/O. The trace data may be collected and analyzed using an I/O analysis module 116 to determine a reconfigured storage stack for the I/O workload that improves I/O performance. For example, the trace data may be analyzed to determine storage processing logic 108 that implements one or more storage techniques (e.g., RAID, caching, tiering, partitioning, mirroring, etc.), and a storage configuration that includes one or more device drivers and storage devices predicted to improve processing of the I/O workload.

When operating in attached mode, as described in more detail below, storage processing logic 108 used to implement the reconfigured storage stack may be attached to the logical storage driver 106. The logical storage driver 106 intercepts I/O requests associated with the I/O workload and the I/O requests may be processed using the attached storage processing logic 108 and the storage configuration. Trace data associated with the I/O workload may continue to be collected and periodically analyzed to determine whether performance of the reconfigured storage stack meets performance specifications. Accordingly, the storage stack 102 may be periodically reconfigured by updating or replacing the storage processing logic 108 attached to the logical storage driver 106 and the device driver(s) 112 and storage device(s) 114 included in the storage configuration. For example, a current storage stack 102 may be reconfigured or replaced by placing the logical storage driver 106 in detached mode and detaching the current storage processing logic 108 and attaching new storage processing logic used with a new storage configuration that may improve processing performance of the I/O workload. Also, in some cases, the storage stack 102 may be reconfigured by updating or replacing the storage processing logic 108 while retaining a current device driver(s) 112 and/or storage device(s) 114 included in the storage configuration.

The various processes and/or other functionality contained within the computing environment 100 may be executed on a computing device, such as a server, having one or more processors that are in communication with one or more memory modules. In one example, the computing environment 100 may include a number of computing devices that are arranged, for example, in one or more server banks or computer banks or other arrangements. In one example, the computing devices may support the computing environment 100 using hypervisors, virtual machine monitors (VMMs), or other virtualization software. The computing environment 100 may comprise a consolidated high-performance computing system that includes loosely coupled storage, networking, and parallel processing functions linked by high bandwidth interconnects. For example, the computing environment 100 may include computing components, such as "nodes" (processor(s), memory, and/or peripherals) that may be communicatively coupled together by, for example, a fabric. The term "fabric" may be used in association with storage area networks (SANs) and with switched fabric networking, as well as with compute resources that provide a complete "unified" computing system. Other terms used to describe such fabrics include, without limitation, unified fabric, data center fabric, unified data center fabric intelligent high-speed fabric, network fabric, or the like. In some examples, a fabric may be a high-speed interconnect operated according to, without limitation, Intel® Corporation's Storm Lake (STL) Fabric Technology using the Intel® Omni-Path architecture (Intel OPA), or operated according to one or more Ethernet specifications.

The I/O analysis module 116 may comprise a processing module, which may also be implemented as a computing service. In one example configuration, a processing module may be considered a service with one or more processes executing on a server or other computer hardware. Such services may be centrally hosted functionality or a service application that receives requests and provides output to other services or computing devices. For example, processing modules providing services may be considered on-demand computing that are hosted in a server, virtualized service environment, grid or cluster computing system. An API (application programming interface) may be provided for each processing module to enable a second processing module to send requests to and receive output from the first processing module. Such APIs may also allow third parties to interface with the processing module and make requests and receive output from the processing modules.

Figure 2:
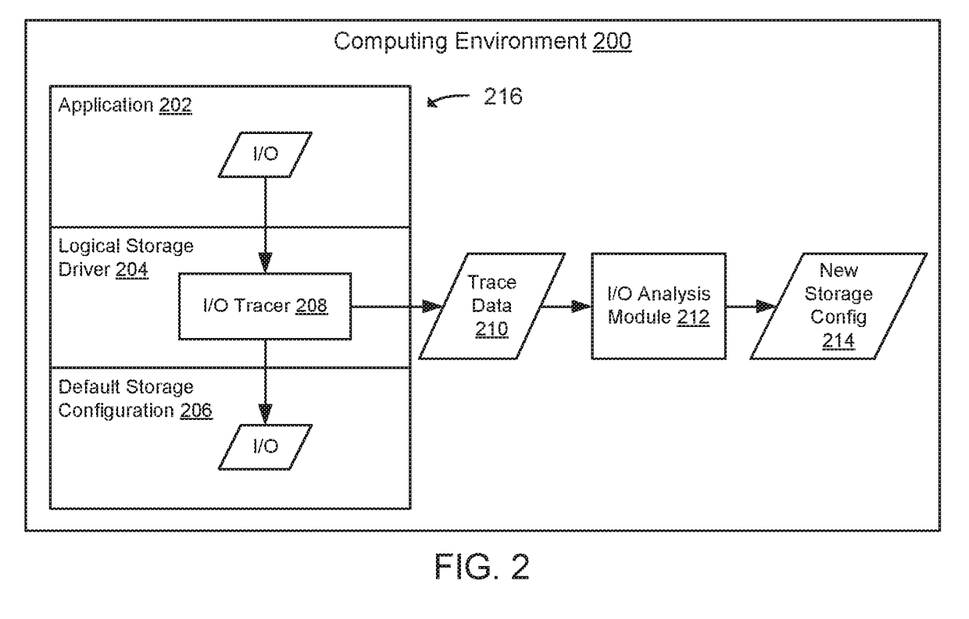
FIG. 2 is a block diagram illustrating the operation of a logical storage driver in detached mode in accordance with an example embodiment.

FIG. 2 is a block diagram that illustrates an example storage stack 216 operating a logical storage driver 204 in detached mode. The storage stack 216 can be executed in a computing environment 200, such as a computer system, a data center, or the like. As a simplified example, the storage stack 216 may include an application 202, a logical storage driver 204, or a default storage configuration 206, which can include default storage processing logic, device driver(s), or storage device(s). While operating in detached mode, I/O requests are passed through the logical storage driver 204 to the default storage configuration 206, which is used to process the I/O requests. For example, the application 202 may generate an I/O request associated with an I/O workload and send the I/O request to the logical storage driver 204. The logical storage driver 204 receives the I/O request and forwards the I/O request to the default storage configuration 206 for processing using default storage processing logic. For example, the default storage configuration 206 may include an initial storage configuration designed based on I/O workload specifications of the application 202.

The logical storage driver 204 may include an I/O tracer 208 configured to monitor I/O passed through the logical storage driver 204 and generate trace data 210 (e.g., I/O metadata) for an I/O workload. For example, the I/O tracer 208 may include utility software configured to monitor driver calls and parameters sent to the logical storage driver 204, monitor the results of the driver call, or generate trace data 210 that describes the driver call, parameters, or results. As a non-limiting example, the I/O tracer 208 may monitor an I/O request sent by the application 202 to the logical storage driver 204 by capturing execution results and metrics (e.g., success or fail, errors, time, duration, operation type (read, write, trim, sync), I/O size, process ID, a filename associated with the I/O, I/O hint (hints for future I/O requests), etc.) associated with execution of the write request and generating trace data 210 describing the write request, parameters, or execution results.

Trace data 210 generated by the I/O tracer 208 may be collected (e.g., in a log file) and classified (e.g., associated with a storage technique, such as RAID, caching, tiering and/or a storage device type) and the trace data 210 can be analyzed to determine I/O workload performance. Illustratively, classification of trace data 210 may be performed by the application 202, a filesystem, logical storage driver 204, or I/O tracer 208 at runtime. Alternatively, classification of trace data 210 may be performed during analysis of the trace data 210. As illustrated, an I/O analysis module 212 may be used to analyze the trace data 210. In one example, the I/O analysis module 212 may be configured to analyze workload execution results or metrics included in trace data 210 for an I/O workload to determine the processing ability of the storage stack 216 to handle the I/O workload. For example, performance metrics (e.g., success or fail metrics, error metrics, time metrics, duration metrics, etc.) can be generated and the performance metrics may be evaluated using performance specifications (e.g., IOPS (I/O operations per second) specifications), QoS specifications, SLA specifications, or other specifications). Because an I/O workload may be dynamic, I/O performance may degrade over time using the default storage configuration 206 included in the storage stack 216. As such, I/O performance may no longer meet performance specifications for the I/O workload. In the case that I/O workload performance using the default storage configuration 206 does not meet the performance specifications, a new storage configuration 214 estimated to meet the performance specifications may be identified, and the storage stack 216 may be reconfigured to include the new storage configuration 214.

The I/O analysis module 212 may be configured to identify a new storage configuration 214 estimated to meet performance specifications for the I/O workload. In one example, the I/O analysis module 212 may be used to simulate new storage configurations 214 and generate estimated performance metrics for the new storage configurations 214, which may be used to identify a new storage configuration 214 estimated to satisfy performance specifications for an I/O workload. For example, various storage techniques (e.g., RAID, caching, tiering, partitioning, mirroring, etc.) or storage components (e.g., HDD (Hard Disk Drive), SSD (Solid State Drive), SAN (Storage Area Network), NAND Device, NVDIMM (Non-Volatile Dual In-line Memory Module) Device, etc.) may be tested in order to identify a storage technique or storage device that meets performance specifications for the I/O workload.

In one example, the I/O analysis module 212 may be configured to select various storage techniques or storage devices to include in a storage configuration and test I/O performance of the storage configuration (e.g., execute a set of simulations using various combinations of RAID, caching, tiering, HDDs, SSDs, etc.). Alternatively, a user may manually select, via a user interface, one or more storage techniques and storage devices and execute an I/O workload simulation using a new storage configuration 214 that includes the storage techniques or storage devices. In another example, the I/O analysis module 212 may use machine learning to identify a new storage configuration 214 estimated to meet performance specifications for an I/O workload. For example, historical trace data for I/O workloads processed using a plurality of storage configurations can be used to train a machine learning model. Thereafter, the I/O analysis module 212 may use the machine learning model and trace data 210 for an I/O workload to identify a new storage configuration 214 estimated to provide increased I/O performance over a current or default storage configuration 206. For example, the trace data 210 may be used to create a feature vector and the machine learning model may then use the feature vector to identify a storage configuration that correlates to the I/O workload. Also, the feature vector may include performance specifications for the I/O workload (e.g., SLA, QoS, and/or IOPS specifications), which can be used by the machine learning model to identify a new storage configuration 214 estimated to meet the performance specifications. Non-limiting examples of machine learning models which may be used by the I/O analysis module 212 include: Bayesian network models, support-vector machines, regression models, or the like.

In another example, performance metrics for a default storage configuration 206 may be provided to a user, who may evaluate the performance metrics and design a new storage configuration 214 estimated to meet performance specifications for an I/O workload. As a specific example, after evaluating performance metrics for a default storage configuration 206, a user may decide that a RAID level used by the default storage configuration 206 results in I/O performance issues, whereupon the user may design or select a new storage configuration 214 that uses a different RAID level estimated to increase I/O performance. The user may then detach the default storage processing logic used to implement the default storage configuration 206 from the logical storage driver 204, and attach storage processing logic to the logical storage driver 204 that implements the new storage configuration 214 for use in the storage stack 216.

The I/O analysis module 212, in one example, can be used to compare performance of a default storage configuration 206 with another storage configuration to determine whether I/O performance for an I/O workload can be improved by replacing the default storage configuration 206 with a new storage configuration 214 that replaces or modifies the default storage configuration 206. For example, performance metrics for the default storage configuration 206 may be compared to estimated performance metrics for a new storage configuration 214 to determine whether I/O performance may be realized by implementing the new storage configuration 214 in the storage stack 216. In the case that improved I/O performance may be realized, as described below in relation to FIG. 3, the default storage configuration 206 in the storage stack 216 may be replaced with the new storage configuration 214.

Figure 3:
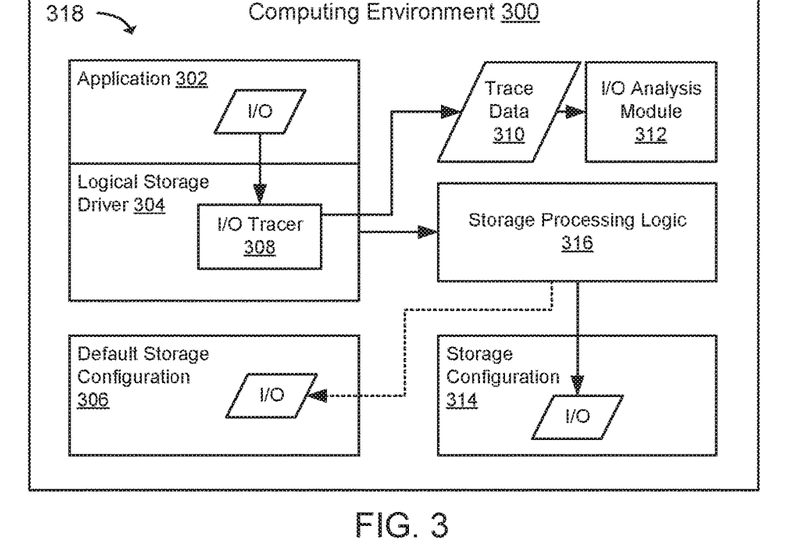
FIG. 3 is a block diagram that illustrates the operation of a logical storage driver in attached mode in accordance with an example embodiment.

FIG. 3 is a block diagram that illustrates an example storage stack 318 operating a logical storage driver 304 in attached mode. As illustrated, the storage stack 318 may be executed in a computing environment 300. In attached mode, storage processing logic 316 may be attached (e.g., registered with) to the logical storage driver 304, and an I/O workload generated by an application 302 may be processed using the storage processing logic 316 and a storage configuration 314 comprising one or more device drivers and storage devices. As described above in relation to FIG. 2, a new storage stack configuration can be determined for an I/O workload by analyzing trace data 310 associated with the I/O workload. The new storage stack configuration may include storage processing logic and a storage configuration that includes storage techniques (e.g., RAID, caching, tiering, etc.), device drivers, or storage devices.

After determining a storage stack configuration that includes storage processing logic 316 and a storage configuration 314, the storage processing logic 316 used to implement the storage configuration 314 may be registered with the logical storage driver 304. The storage processing logic 316 may include instructions for processing I/O received from the application 302 using one or more storage techniques with one or more storage devices included in the storage configuration 314. As a non-limiting example, the storage processing logic 316 may be included in a driver file or library file, such as a DLL (dynamic link library), and a file path for the driver or library file containing the storage processing logic 316 may be registered with the logical storage driver 304. As another example, the storage processing logic 316 may be implemented using an object file, such as a loadable kernel module (LKM). When operating in attached mode, the logical storage driver 304 causes the driver or library file containing the storage processing logic 316 to be loaded into computer memory, and the logical storage driver 304 sends I/O received from the application 302 to the storage processing logic 316 for processing. The storage processing logic 316 interfaces with device drivers included in the storage configuration 314, which in turn interface with storage devices included in the storage configuration 314 to handle I/O stored on the storage devices.

In some examples, the storage processing logic 316 may be configured to continue using a default storage configuration 306 in combination with a storage configuration 314. For example, it may be beneficial to continue using some aspect of the default storage configuration 306 (e.g., a table, query, report, module, etc.) due to, for example, computing resource constraints, time constraints, or to avoid storage configuration duplication, as well as other considerations. The storage processing logic 316 may be configured to continue to access the default storage configuration 306, as well as access the new storage configuration 314, as part of processing an I/O workload generated by the application 302.

While in attached mode, the logical storage driver 304 may be configured to collect trace data 310 associated with an I/O workload generated by an application 302. As illustrated, an I/O tracer 308 may be used to generate trace data 310, and the trace data 310 may be collected and analyzed using an I/O analysis module 312 as described in association with FIG. 2. Analysis of the trace data 310 may be performed to determine whether a current storage stack configuration 318 meets performance specifications for the I/O workload, and/or whether I/O performance may be improved using an alternative storage stack configuration defined for the I/O workload. In determining that the alternative storage stack configuration may improve I/O performance of the I/O workload, the logical storage driver 304 may be placed in detached mode, and the alternative storage stack configuration may be implemented by detaching the storage processing logic 316 for the current storage stack configuration 318 from the logical storage driver 304 and attaching new storage processing logic to the logical storage driver 304 that implements the alternative storage stack configuration. After attaching the new storage processing logic, the logical storage driver 304 may be placed in attached mode and I/O requests associated with the I/O workload may be processed using the alternative storage stack configuration.

Figure 4:
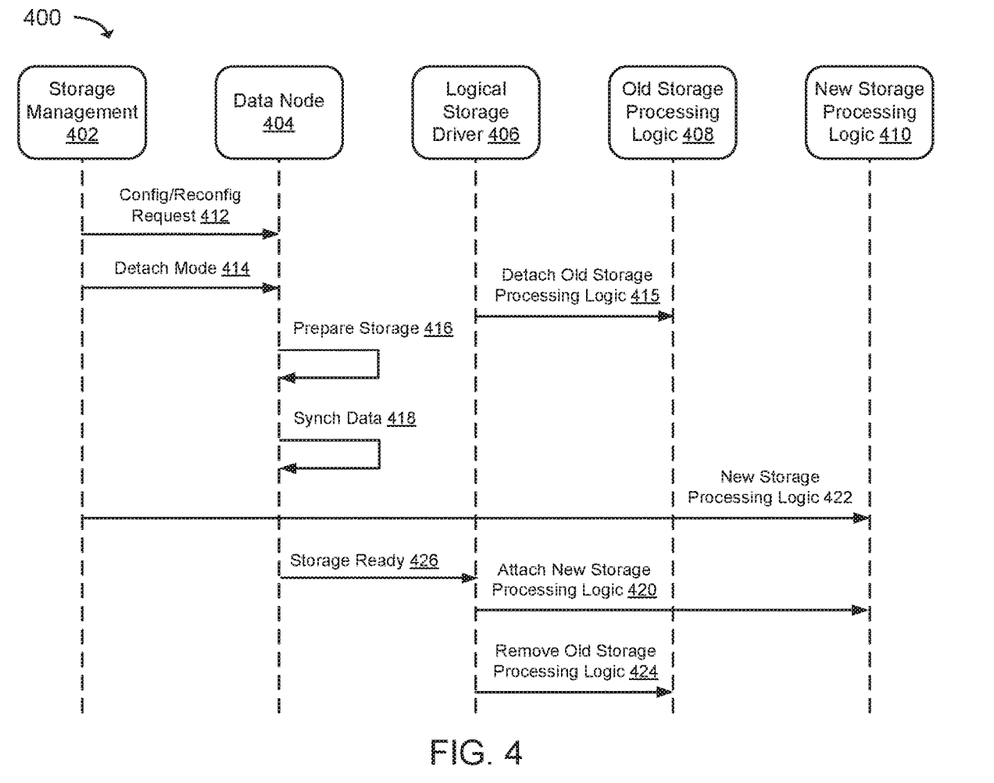
FIG. 4 is a sequence diagram illustrating an example method for implementing a storage stack configuration used to process an I/O workload in accordance with an example embodiment.

FIG. 4 is a sequence diagram illustrating an example method 400 for implementing a storage stack configuration used to process an I/O workload. In this example, a data node 404 may be configured or reconfigured to provide a storage configuration to store I/O associated with the I/O workload. The data node 404 may include, but is not limited to: a physical server with one or more HDDs and/or SDDs, a virtual machine with access to one or more HDDs and/or SSDs, or a virtual storage node connected to a virtual storage network (VSAN). Storage management 402 may be used to manage a logical storage driver 406 and manage a storage configuration/reconfiguration. The storage management 402 may be provided by an I/O analysis module 212, as described in association with FIG. 2, configured to initiate a storage configuration/reconfiguration, or the storage management 402 may be provided by a systems administrator who initiates the storage configuration/reconfiguration.

As part of initiating a storage configuration, the storage management 402 sends a config/reconfig request 412 to the data node 404 requesting that one or more storage devices included in the data node 404 be configured/reconfigured according to specifications provided in the config/reconfig request 412. For instance, the config/reconfig request 412 may include instructions for the data node 404 to prepare storage for a specified storage configuration determined by the storage management 402. After receiving the config/reconfig request 412 from the storage management 402, the data node 404 may initiate preparation 416 of the storage devices included in the data node 404 according to the specifications received from the storage management 402. As an example, the data node 404 may initiate partitioning of a storage device, configuration of a NVMe (Non-Volatile Memory express) device over a network fabric device, configuration of a storage block device using an NVDIMM (Non-Volatile Dual In-line Memory Module), as well as other storage configurations. Also, as part of preparing the storage 416, data contained on storage devices included in an old storage configuration may be copied to storage devices included in a new storage configuration. As an example, the data may be copied from an old storage device to a new storage device, or the data may be copied from an old storage partition on a storage device to a new storage partition on the same storage device.

In combination with sending the config/reconfig request 412 to the data node 404 to configure/reconfigure storage devices, the storage management 402 sends a detach mode request 414 to the data node 404, which executes the logical storage driver 406, to switch operation of the logical storage driver 406 from attached mode to detached mode. Thereafter, the data node 404 causes the old storage processing logic 408 (e.g., deregisters the old storage processing logic 408 from the logical storage driver 406) to be detached 415 from the logical storage driver 406. In detached mode, the logical storage driver 406 discontinues processing of I/O using old storage processing logic 408 for an old storage configuration and begins forwarding the I/O to a default storage configuration (e.g., managed by the data node 404) for processing of the I/O. In another example, responsibility for notifying the logical storage driver 406 about the configuration/reconfiguration may be delegated to the data node 404. For example, in response to receiving the config/reconfig request 412 from storage management 402, the data node 404 notifies the logical storage driver 406 (via a message) of the configuration/reconfiguration of the storage configuration, whereupon the logical storage driver 406 switches operation to detached mode.

New storage processing logic 410 for use with the new storage configuration may be created 422. In one example, storage management 402 may provide the new storage processing logic 410. More specifically, an I/O analysis module, as described in relation to FIG. 2, may be configured to generate the new storage processing logic 410, and the storage management 402 may deploy the new storage processing logic 410. In another example, an administrator may create the new storage processing logic 410 and deploy the new storage processing logic 410 using a storage management 402 tool. The new storage processing logic 410 used to implement the new storage configuration may improve I/O performance associated with an I/O workload by replacing or modifying storage techniques that are expected to improve the I/O performance. As one non-limiting example, storage processing logic for caching data on a NAND device may be replaced with a two level cache comprising a first level cache on a NVDIMM device and a second level cache on the NAND device. As another non-limiting example, storage processing logic for a two level cache (level one on a NVDIMM device and level two on a NAND device) can be replaced with tiering on the NVDIMM and NAND devices. As yet another non-limiting example, storage processing logic for a RAID volume After the storage devices included in the data node 404 have been prepared according to the specifications received from the storage management 402, and prior to implementing a new storage configuration, the data node 404 may synchronize data 418 between storages. As one example, data may be synchronized by sending data from the default storage used to process I/O while operating in detached mode, to a storage device included in the new storage configuration. In one example, a write-back cache used by the default storage may be synchronized with the new storage by switching the write-back cache to a non-write-back cache (e.g., a write-through cache). The dirty data contained in the write-back cache may then be written to the default storage prior to synchronizing data 418 between the storages and sending new I/O to the new storage configuration.

In response to receiving a notification from the data node 404 that the storage configuration is ready for use 426, the logical storage driver 406 switches operation to attached mode by attaching 420 (e.g., registering) new storage processing logic 410 used to process the I/O workload. For example, the storage management 402 can provide a file path for a driver or library file containing the new storage processing logic 410 and the new storage processing logic 410 may be registered with the logical storage driver 406. After attaching the new storage processing logic 410, the logical storage driver 406 removes 424 (e.g., deregisters and deletes) the old storage processing logic 408.

Figure 5A:
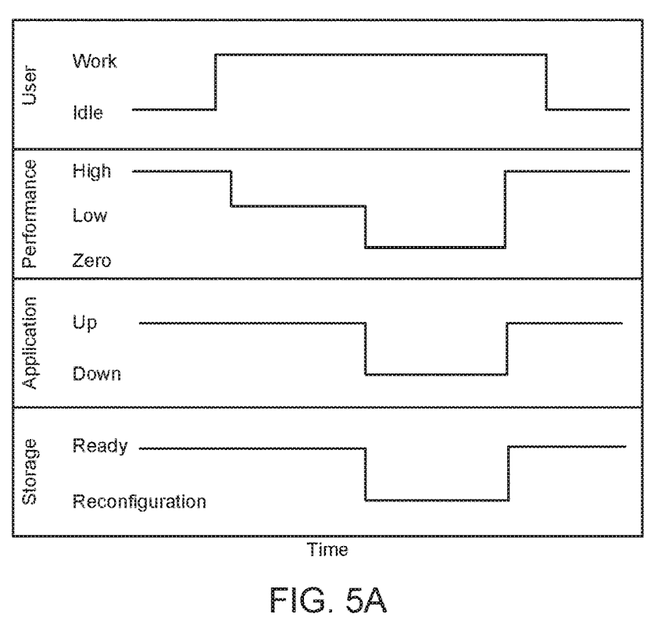
FIG. 5A is a timeline diagram used to illustrate an example use case for handling performance changes related to an I/O workload generated by an application running on a traditional system.
Figure 5B:
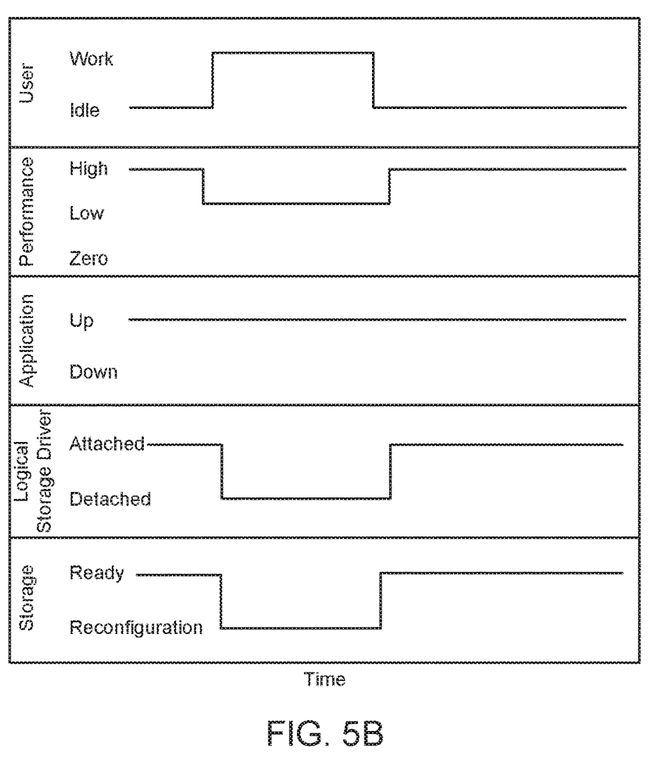
FIG. 5B is a timeline diagram used to illustrate an example use case for handling performance changes related to an I/O workload generated by an application running on a system in accordance with an example embodiment.

FIGS. 5A-5B are timeline diagrams used to illustrate example use cases for handling performance changes related to an I/O workload generated by an application. FIG. 5A represents past technology for handling a performance change related to an I/O workload for a storage stack that does not include a logical storage driver. As shown, performance can degrade over time. In cases where a storage infrastructure lacks an alerting mechanism, performance degradation may go undetected for a period of time. Upon realizing the performance degradation, an administrator may begin analyzing the I/O workload in order to discover the cause of the performance degradation. An amount of time spent isolating the cause of performance degradation may depend on the complexity of the storage architecture, and therefore the amount of time may be undefined.

After finding the cause of the performance degradation, the administrator may reconstruct the storage configuration, during which, the application may be down, making the application unavailable to users. After the storage configuration has been reconfigured, the application can be brought up, but the administrator may have to monitor performance for a time to ensure that the storage configuration meets performance specifications.

FIG. 5B represents the present technology for handling a performance change related to an I/O workload for a storage stack that includes a logical storage driver. Because the logical storage driver may collect trace data associated with an I/O workload, a performance drop (e.g., QoS and/or SLA performance drops) associated with a storage configuration can be detected by analyzing the trace data. As a result, a performance drop may not go unnoticed for an extended period of time. For example, after detecting performance degradation, a notification alert that performance of a storage configuration has degraded may be sent to the logical storage driver, whereupon the logical storage configuration may switch to detached mode and forward I/O requests to a default data storage device for processing of the I/O workload associated with the I/O requests. During the time that the logical storage driver is operating in detached mode, the application may continue to be up and available to users. A new storage configuration may be determined using the trace data, as described earlier, and the new storage configuration may be implemented by replacing old storage processing logic used with the old storage configuration with new storage processing logic, and the logical storage driver may be switched to attached mode.

Figure 6:
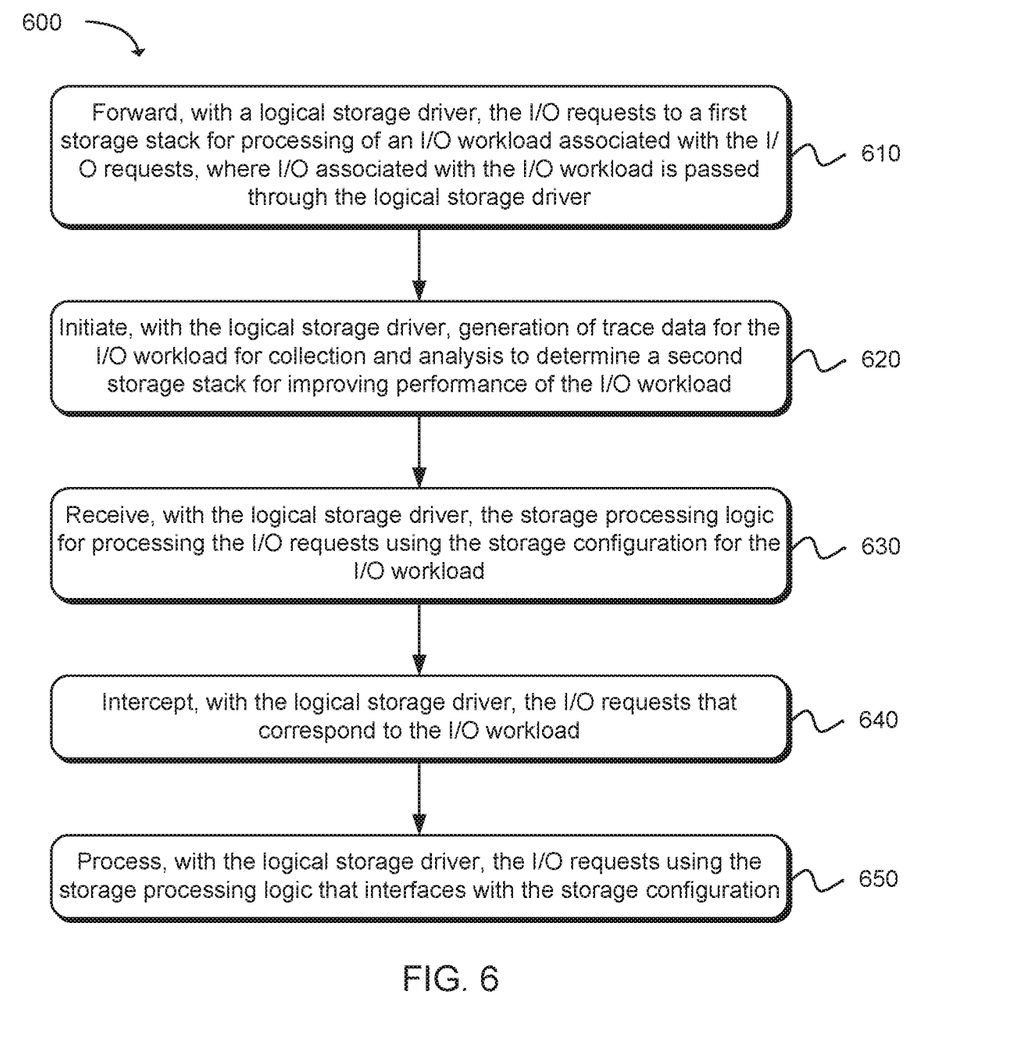
FIG. 6 is a flow diagram that illustrates an example method for processing I/O requests using storage processing logic attached to a logical storage driver in accordance with an example embodiment.

FIG. 6 is a flow diagram that illustrates an example method for processing I/O requests using storage processing logic attached to a logical storage driver. Initially, as in block 610, I/O requests from an application (e.g., filesystem) associated with an I/O workload can be forwarded to a first storage stack (a current storage stack) for processing of the I/O workload, where I/O associated with the I/O workload may be passed through the logical storage driver to the first storage stack comprising storage processing logic and one or more storage drivers and storage devices.

As in block 620, the logical storage driver may be configured to initiate generation of trace data for the I/O workload for collection and analysis to determine a second storage stack (a new storage stack) that can may used to improve performance of the I/O workload. The second storage stack may comprise storage processing logic and a storage configuration used to process the I/O workload. In one example, the logical storage driver may be configured to utilize an I/O tracer to generate the trace data. The trace data for the I/O workload may be collected and analysis of the trace data may be performed to determine whether the first storage stack meets performance specifications for the I/O workload. Also, analysis of the trace data may be performed periodically to detect performance degradation associated with use of the first storage stack. Detection of performance degradation associated with use of the first storage stack may trigger a notification alert that causes the logical storage driver to enable detached mode and forward I/O requests to a default storage stack for processing of the I/O workload, thereby avoiding further performance degradation or failure of an application that utilizes the first storage stack.

In the case that the first storage stack fails to meet performance specifications, or performance degradation of the first storage stack is detected, a second storage stack expected to meet the performance specifications for the I/O workload may be determined. In one example, the second storage stack (i.e., storage processing logic and a storage configuration) may be determined using QoS specifications. Illustratively, the QoS specifications may be provided by a customer of a computing service provider. In another example, the second storage stack can be determined using an SLA between a service provider and a service provider customer. And in another example, the second storage stack can be determined using a machine learning model.

After a second storage stack has been identified, a request to configure storage components (e.g., HDDs, SSDs, etc.) according to a storage configuration of the second storage stack may be made by an administrator or the analysis module described earlier to a storage node. The storage node can provide a notification to the logical storage driver or administrator that the storage components are ready for use. Storage processing logic used with the storage configuration according to the second storage stack may be created.

As in block 630, the logical storage driver may receive the storage processing logic for the second storage stack used to process the I/O requests associated with the I/O workload. The storage processing logic may replace existing storage processing logic with new storage processing logic that interfaces with a new storage configuration included in the second storage stack. For example, the storage processing logic sends I/O tasks included in the I/O workload to the new storage configuration included in the second storage stack.

Having received the storage processing logic, an attached mode may be enabled, where the attached mode comprises intercepting, with the logical storage driver, the I/O requests that correspond to the I/O workload, as in block 640, and processing, with the logical storage driver, the I/O requests using the storage processing logic that interfaces with the storage components according to the storage configuration, as in block 650. The attached mode may further include causing the trace data for the I/O workload to be generated and collected, and the trace data may be analyzed to detect performance degradation associated with use of the second storage stack.

Figure 7:
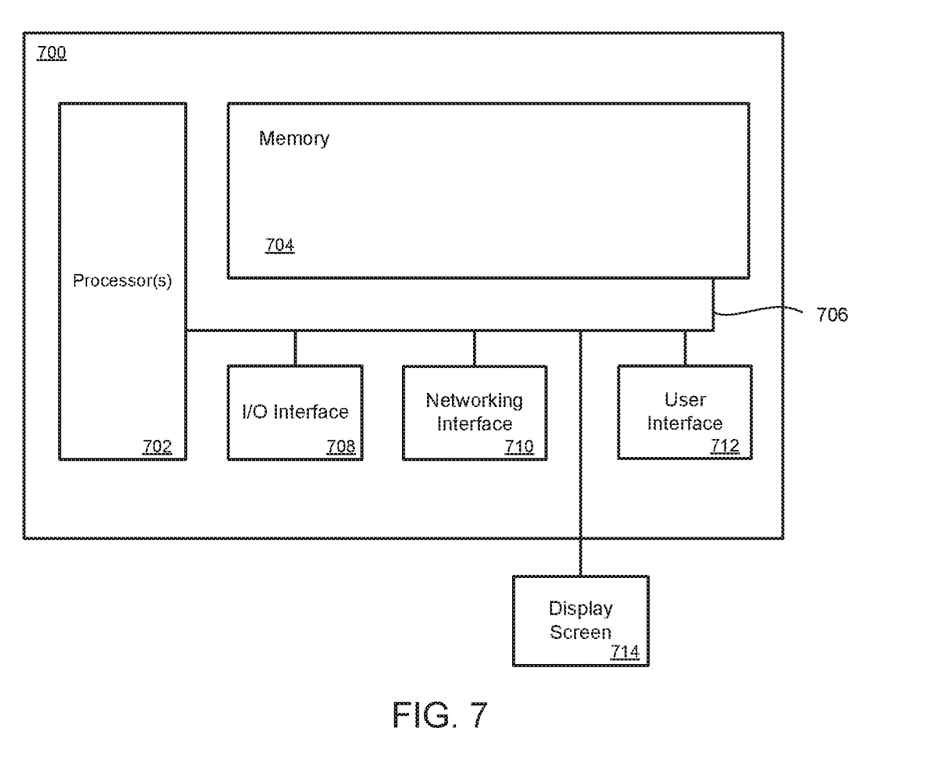
FIG. 7 illustrates a computing system that includes a memory device in accordance with an example embodiment.

FIG. 7 illustrates a general computing system or device 700 that may be employed in the present technology. The computing system or device 700 may include a processor 702 in communication with a memory 704. The memory 704 may include any device, combination of devices, circuitry, or the like that may be capable of storing, accessing, organizing, and/or retrieving data.

The computing system or device 700 additionally includes a local communication interface 706 for connectivity between the various components of the system. For example, the local communication interface 706 may be a local data bus and/or any related address or control busses as may be desired.

The computing system or device 700 may also include an I/O interface 708 for controlling the I/O functions of the system, as well as for I/O connectivity to devices outside of the computing system 700. A network interface 710 may also be included for network connectivity. The network interface 710 may control network communications both within the system and outside of the system. The network interface may include a wired interface, a wireless interface, a Bluetooth interface, optical interface, and the like, including appropriate combinations thereof. Furthermore, the computing system 700 may additionally include a user interface 712, a display device 714, as well as various other components that would be beneficial for such a system.

The processor 702 may be a single or multiple processors, and the memory 704 may be a single or multiple memories. The local communication interface 706 may be used as a pathway to facilitate communication between any of a single processor, multiple processors, a single memory, multiple memories, the various interfaces, or the like, in any useful combination.

Various techniques, or certain aspects or portions thereof, can take the form of program code (i.e., instructions) embodied in tangible media, such as CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory.

EXAMPLES

The following examples pertain to specific embodiments and point out specific features, elements, or steps that can be used or otherwise combined in achieving such embodiments.

In one example, there is provided a data storage system for processing I/O workloads using a logical storage driver, comprising at least one processor, a memory device including instructions that, when executed by the at least one processor, cause the data storage system to receive, with the logical storage driver, a request to perform an I/O workload using a storage stack that includes storage processing logic and a storage configuration defined for the I/O workload, process, with the logical storage driver, the I/O workload using the storage processing logic to send I/O tasks included in the I/O workload to the storage configuration, and initiate, with the logical storage driver, generation of trace data for the I/O workload for analysis to determine whether I/O performance using the storage stack meets performance specifications for the I/O workload.

In one example of the data storage system, the memory device includes instructions that, when executed by the processor, cause the data storage system to determine via analysis of the trace data that use of the storage stack does not meet the performance specifications for the I/O workload.

In one example of the data storage system, the memory device includes instructions that, when executed by the processor, cause the data storage system to identify a second storage stack that meets the performance specifications for the I/O workload.

In one example of the data storage system, the memory device includes instructions that, when executed by the processor, cause the data storage system to synchronize data from a storage component of the storage configuration to a second storage component of a second storage configuration.

In one example of the data storage system, the memory device includes instructions that, when executed by the processor, cause the data storage system to detach the storage processing logic used with the storage configuration from the logical storage driver.

In one example of the data storage system, the memory device includes instructions that, when executed by the processor, cause the data storage system to further implement a detached mode configured to forward, with the logical storage driver, the I/O workloads to a default storage stack for processing of the I/O workload.

In one example of the data storage system, memory device includes instructions that, when executed by the processor, cause the data storage system to attach new storage processing logic according to the second storage stack to the logical storage driver which utilizes a new storage configuration.

In one example, there is provided a computer implemented method for processing I/O (Input/Output) workloads using a logical storage driver, comprising forwarding, with the logical storage driver, the I/O workloads to a first storage stack for processing of the I/O workload, wherein I/O associated with the I/O workload is passed through the logical storage driver, initiating, with the logical storage driver, generation of trace data for the I/O workload for collection and analysis to determine a second storage stack for improving performance of the I/O workload, wherein the second storage stack comprises storage processing logic and a storage configuration, receiving, with the logical storage driver, the storage processing logic for processing the I/O workload using the storage configuration for the I/O workload, wherein the storage processing logic interfaces with the storage configuration, intercepting, with the logical storage driver, I/O requests that correspond to the I/O workload, and processing, with the logical storage driver, the I/O workloads using the storage processing logic that interfaces with the storage configuration.

In one example of the method, the storage processing logic sends I/O tasks included in the I/O workload to the storage configuration.

In one example of the method, the storage configuration includes at least a data storage driver and a data storage device.

In one example of the method, determining the second storage stack used to improve the performance of the I/O workload includes using QoS (Quality of Service) specifications to determine the storage configuration.

In one example of the method, determining the second storage stack used to improve the performance of the I/O workload includes using a SLA (Service Level Agreement) to determine the storage configuration.

In one example of the method, determining the second storage stack used to improve the performance of the I/O workload includes analyzing the trace data using a machine learning model to identify the storage configuration.

In one example of the method, the method further comprises requesting configuration of storage components according to the second storage stack and receiving a notification that the storage components according to the second storage stack are ready.

In one example of the method, the method further comprises collecting trace data for the I/O workload performed using the first storage stack, detecting via analysis of the trace data that use of the first storage stack does not meet performance specifications for the I/O workload, and identifying the second storage stack that meets the performance specifications for the I/O workload.

In one example of the method, the method further comprises synchronizing data from a data cache used by the first storage stack with the second storage stack.

In one example of the method, the method further comprises replacing the storage processing logic for the first storage stack with new storage processing logic for the second storage stack.

In one example, there is provided a non-transitory machine readable storage medium for a logical storage driver having instructions embodied thereon, the instructions when executed by a processor, execute in a detached mode, comprising forwarding an I/O (Input/Output) workload received with the logical storage driver to a default storage stack for processing of the I/O workload, initiate generation of trace data for the I/O workload, and initiate sending of the trace data for collection and analysis to determine a second storage stack that meets performance specifications of the I/O workload, wherein the second storage stack includes storage processing logic used with a storage configuration used to handle the I/O workload, receive the storage processing logic for processing the I/O workloads using the storage configuration, wherein the storage processing logic interfaces with the storage configuration included in the second storage stack, and enable an attached mode comprising intercepting the I/O workload and processing the I/O workload using the storage processing logic and storage configuration according to the second storage stack.

In one example of the non-transitory machine readable storage medium, the attached mode further comprises causing the trace data for the I/O workload processed using the storage processing logic and storage configuration to be generated and collected.

In one example of the non-transitory machine readable storage medium, the attached mode further comprises analyzing the trace data to detect performance degradation associated with use of the second storage stack.

In one example of the non-transitory machine readable storage medium, the instructions that, when executed by the processor, further receive a notification alert that I/O performance associated with the second storage stack has degraded, and enable the detached mode to forward I/O workloads received with the logical storage driver to the default storage stack for processing of the I/O workloads.

In one example of the non-transitory machine readable storage medium, the instructions that when executed by the processor further request storage processing logic for a second storage stack that meets the performance specifications of the I/O workload.

What is claimed is:

1. A data storage system, comprising: at least one processor;
   a memory device including instructions that, when executed by the at least one processor, cause the data storage system to:
   receive, with a logical storage driver in a detached mode, a request to perform an I/O (input/output) workload, and forward, by the logical storage driver in the detached mode, the I/O workload to a default storage stack;
   determine, with the logical storage driver, a second storage stack based on analysis of collected trace data, the second storage stack including storage processing logic defined for the I/O workload and a storage configuration defined for the I/O workload;
   attach the storage processing logic according to the second storage stack to the logical storage driver;
   process, with the logical storage driver in an attached mode instantiated therefor, the I/O workload using the storage processing logic to send I/O tasks included in the I/O workload to the storage configuration; and
   initiate, with the logical storage driver, generation of trace data for the I/O workload for analysis to determine whether I/O performance using a default or second storage stack meets performance specifications for the I/O workload.

2. The data storage system as in claim 1, wherein the memory device includes instructions that, when executed by the at least one processor, cause the data storage system to determine via analysis of the trace data that use of the storage stack does not meet the performance specifications for the I/O workload.

3. The data storage system as in claim 2, wherein the memory device includes instructions that, when executed by the at least one processor, cause the data storage system to identify a second storage stack that meets the performance specifications for the I/O workload.

4. The data storage system as in claim 3, wherein the memory device includes instructions that, when executed by the at least one processor, cause the data storage system to synchronize data from a storage component of the storage configuration to a second storage component of a second storage configuration.

5. The data storage system as in claim 3, wherein the memory device includes instructions that, when executed by the at least one processor, cause the data storage system to detach the storage processing logic used with the storage configuration from the logical storage driver.

6. The data storage system as in claim 5, wherein the detached mode is configured to forward, with the logical storage driver, I/O workloads to a default storage stack for processing of the I/O workloads.

7. A computer implemented method for processing I/O (input/output) workloads using a logical storage driver, comprising:
   forwarding, by the logical storage driver in a detached mode, a received I/O workload to a default storage stack for processing of the I/O workload, wherein I/O associated with the I/O workload is passed through the logical storage driver;
   initiating generation of trace data for the I/O workload for collection and analysis to determine a second storage stack for improving performance of the I/O workload, wherein the second storage stack comprises storage processing logic and a storage configuration defined to handle the I/O workload;
   receiving the storage processing logic for processing the I/O workload using the storage configuration for the I/O workload, wherein the storage processing logic interfaces with the storage configuration;
   attaching the storage processing logic according to the second storage stack to the logical storage driver;
   intercepting, by the logical storage driver in an attached mode instantiated therefor, I/O requests that correspond to the I/O workload; and
   processing, by the logical storage driver in the attached mode, the I/O workload using the storage processing logic that interfaces with the storage configuration.

8. The method as in claim 7, wherein the storage processing logic sends I/O tasks included in the I/O workload to the storage configuration.

9. The method as in claim 7, wherein the storage configuration includes at least a data storage driver and a data storage device.

10. The method as in claim 7, wherein determining the second storage stack used to improve the performance of the I/O workload includes using QoS (quality of service) specifications to determine the storage configuration.

11. The method as in claim 7, wherein determining the second storage stack used to improve the performance of the I/O workload includes using an SLA (service level agreement) to determine the storage configuration.

12. The method as in claim 7, wherein determining the second storage stack used to improve the performance of the I/O workload includes analyzing the trace data using a machine learning model to identify the storage configuration.

13. The method as in claim 7, further comprising:
requesting configuration of storage components according to the second storage stack; and
receiving a notification that the storage components according to the second storage stack are ready.

14. The method as in claim 7, further comprising:
collecting trace data for the I/O workload performed using the first storage stack;
detecting via analysis of the trace data that use of the first storage stack does not meet performance specifications for the I/O workload; and
identifying the second storage stack that meets the performance specifications for the I/O workload.

15. The method as in claim 14, further comprising synchronizing data from a data cache used by the first storage stack with the second storage stack.

16. The method as in claim 14, further comprising replacing the storage processing logic for the first storage stack with new storage processing logic for the second storage stack.

17. A non-transitory machine readable storage medium having instructions embodied thereon, the instructions when executed by a processor, cause a logical storage driver to:
execute in a detached mode of the logical storage driver to forward a received I/O (input/output) workload to a default storage stack for processing of the I/O workload;
initiate generation of trace data for the I/O workload;
initiate sending of the trace data for collection and analysis to determine a second storage stack that meets performance specifications of the I/O workload, wherein the second storage stack includes storage processing logic used with a storage configuration used to handle the I/O workload;
receive the storage processing logic for processing the I/O workload, wherein the storage processing logic interfaces with the storage configuration included in the second storage stack;
attach the storage processing logic to the logical storage driver according to the second storage stack; and
enable an attached mode instantiated for the logical storage driver to intercept I/O requests associated with the I/O workload and process the I/O workload using the storage processing logic and the storage configuration according to the second storage stack.

18. The non-transitory machine readable storage medium in claim 17, wherein the attached mode further comprises the logical storage driver to cause the trace data for the I/O workload processed using the storage processing logic and storage configuration to be generated and collected.

19. The non-transitory machine readable storage medium in claim 17, wherein the attached mode further comprises the logical storage driver to analyze the trace data to detect performance degradation associated with use of the second storage stack.

20. The non-transitory machine readable storage medium in claim 17, wherein the instructions that when executed by the processor further cause the logical storage driver to:
receive a notification alert that I/O performance associated with the second storage stack has degraded; and
enable the detached mode to forward I/O workloads received with the logical storage driver to the default storage stack for processing of the I/O workload.

21. The non-transitory machine readable storage medium in claim 20, wherein the instructions that when executed by the processor further cause the logical storage driver to request storage processing logic for a second storage stack that meets the performance specifications of the I/O workload.

* * * * *